US007828998B2

(12) United States Patent
Luscher et al.

(10) Patent No.: US 7,828,998 B2
(45) Date of Patent: Nov. 9, 2010

(54) MATERIAL HAVING A CONTROLLED MICROSTRUCTURE, CORE-SHELL MACROSTRUCTURE, AND METHOD FOR ITS FABRICATION

(75) Inventors: Walter G. Luscher, Jenison, MI (US); John R. Hellmann, State College, PA (US); Barry E. Scheetz, Lemont, PA (US); Brett A. Wilson, Lafayette, LA (US)

(73) Assignee: Carbo Ceramics, Inc., Houston, TX (US)

( * ) Notice: Subject to any disclaimer, the term of this patent is extended or adjusted under 35 U.S.C. 154(b) by 500 days.

(21) Appl. No.: 11/775,671

(22) Filed: Jul. 10, 2007

(65) Prior Publication Data

US 2008/0015103 A1 Jan. 17, 2008

Related U.S. Application Data

(60) Provisional application No. 60/807,012, filed on Jul. 11, 2006.

(51) Int. Cl.
*B29C 65/02* (2006.01)
*B29C 67/20* (2006.01)

(52) U.S. Cl. .............................. 264/41; 264/42; 264/43; 264/46.6; 264/49

(58) Field of Classification Search ................... 264/41, 264/43, 46.4, 42, 46.6, 49, 50
See application file for complete search history.

(56) References Cited

U.S. PATENT DOCUMENTS 1,942,431 A 1/1934 Jung 2,566,117 A 8/1951 Christie et al.

(Continued)

FOREIGN PATENT DOCUMENTS

AR 241543 8/1992

(Continued)

OTHER PUBLICATIONS

International Search Report, mailed Dec. 27, 2007, by the U.S. International Searching Authority, in connection with International Application No. PCT/US2007/073247.

(Continued)

*Primary Examiner*—H. (Holly) T Le
(74) *Attorney, Agent, or Firm*—Haynes and Boone, LLP

(57) ABSTRACT

Disclosed is a method for making a material having a controlled microstructure, the method including providing particles of a ceramic mineral material, the particles having a metal oxide dopant therein. The particles of the ceramic mineral material are consolidated into larger aggregates of a size relevant to the desired application using standard industrial mixing and pelletizing technology. The aggregates are heated under reducing conditions so that at least part of the dopant is reduced to form a transient, metastable liquid phase among the particles. The liquid phase includes at least part of the reduced dopant and promotes sintering of the particles and forms islands of reduced metal within the material and on the surface of the aggregates. Following heating of the aggregates under reducing conditions, the aggregates are heated under oxidizing conditions such that the islands of reduced metal are oxidized and/or go into solid solution within the particles, thereby creating voids within and form a shell thereon the particles.

16 Claims, 2 Drawing Sheets

U.S. PATENT DOCUMENTS

| | | | |
|---|---|---|---|
| 2,699,212 | A | 1/1955 | Dismukes |
| 2,799,074 | A | 7/1957 | Garloni |
| 2,950,247 | A | 8/1960 | McGuire, Jr. et al. |
| 2,966,457 | A | 12/1960 | Starmann et al. |
| 3,026,938 | A | 3/1962 | Huitt et al. |
| 3,075,581 | A | 1/1963 | Kern |
| 3,079,243 | A | 2/1963 | Ueltz |
| 3,126,056 | A | 3/1964 | Harrell |
| 3,241,613 | A | 3/1966 | Kern et al. |
| 3,242,032 | A | 3/1966 | Schott |
| 3,245,866 | A | 4/1966 | Schott |
| 3,347,798 | A | 10/1967 | Baer et al. |
| 3,350,482 | A | 10/1967 | Bowers |
| 3,399,727 | A | 9/1968 | Graham et al. |
| 3,437,148 | A | 4/1969 | Colpoys, Jr. |
| 3,486,706 | A | 12/1969 | Weyand |
| 3,491,492 | A | 1/1970 | Ueltz |
| 3,497,008 | A | 2/1970 | Graham et al. |
| 3,598,373 | A | 8/1971 | Inman |
| 3,663,165 | A | 5/1972 | Haden, Jr. et al. |
| 3,690,622 | A | 9/1972 | Brunner et al. |
| 3,758,318 | A | 9/1973 | Farris et al. |
| 3,810,768 | A | 5/1974 | Parsons et al. |
| 3,856,441 | A | 12/1974 | Suzukawa et al. |
| 3,890,072 | A | 6/1975 | Barks |
| 3,939,246 | A | 2/1976 | Rollmann |
| 3,976,138 | A | 8/1976 | Colpoys, Jr. et al. |
| 4,051,603 | A | 10/1977 | Kern, Jr. |
| 4,052,794 | A | 10/1977 | Ganiaris |
| 4,053,375 | A | 10/1977 | Roberts et al. |
| 4,061,596 | A | 12/1977 | Matsushita et al. |
| 4,068,718 | A | 1/1978 | Cooke, Jr. et al. |
| 4,072,193 | A | 2/1978 | Sarda et al. |
| 4,077,908 | A | 3/1978 | Stenzel et al. |
| 4,104,342 | A | 8/1978 | Wessel et al. |
| 4,113,660 | A | 9/1978 | Abe et al. |
| 4,140,773 | A | 2/1979 | Stowell et al. |
| 4,166,147 | A | 8/1979 | Lange et al. |
| 4,191,720 | A * | 3/1980 | Pasco et al. .................. 264/43 |
| 4,195,010 | A | 3/1980 | Russell et al. |
| 4,268,311 | A | 5/1981 | VerDow |
| 4,296,051 | A | 10/1981 | Shimamura et al. |
| 4,303,204 | A | 12/1981 | Weston |
| 4,343,751 | A | 8/1982 | Kumar |
| 4,371,481 | A | 2/1983 | Pollock |
| 4,396,595 | A | 8/1983 | Heytmeijer et al. |
| 4,407,967 | A | 10/1983 | Luks |
| 4,427,068 | A | 1/1984 | Fitzgibbon |
| 4,439,489 | A | 3/1984 | Johnson et al. |
| 4,440,866 | A | 4/1984 | Lunghofer et al. |
| 4,442,897 | A | 4/1984 | Crowell |
| 4,450,184 | A | 5/1984 | Longo et al. |
| 4,462,466 | A | 7/1984 | Kachnik |
| 4,493,875 | A | 1/1985 | Beck et al. |
| 4,521,475 | A | 6/1985 | Riccio et al. |
| 4,522,731 | A | 6/1985 | Lunghofer |
| 4,547,468 | A | 10/1985 | Jones et al. |
| 4,555,493 | A | 11/1985 | Watson et al. |
| 4,601,997 | A | 7/1986 | Speronello |
| 4,618,504 | A | 10/1986 | Bosna et al. |
| 4,623,630 | A | 11/1986 | Fitzgibbon |
| 4,632,876 | A | 12/1986 | Laird et al. |
| 4,639,427 | A | 1/1987 | Khaund |
| 4,652,411 | A | 3/1987 | Swarr et al. |
| 4,654,266 | A | 3/1987 | Kachnik |
| 4,658,899 | A | 4/1987 | Fitzgibbon |
| 4,668,645 | A | 5/1987 | Khaund |
| 4,680,153 | A * | 7/1987 | Kinder et al. .................. 264/44 |
| 4,680,230 | A | 7/1987 | Gibb et al. |
| 4,713,203 | A | 12/1987 | Andrews |
| 4,714,623 | A | 12/1987 | Riccio et al. |
| 4,732,920 | A | 3/1988 | Graham et al. |
| 4,744,831 | A | 5/1988 | Beck |
| 4,840,729 | A | 6/1989 | Levine |
| 4,879,181 | A | 11/1989 | Fitzgibbon |
| 4,894,189 | A | 1/1990 | Dave et al. |
| 4,894,285 | A | 1/1990 | Fitzgibbon |
| 4,911,987 | A | 3/1990 | Sakata et al. |
| 4,921,820 | A | 5/1990 | Rumpf et al. |
| 4,921,821 | A | 5/1990 | Rumpf et al. |
| 4,993,491 | A | 2/1991 | Palmer et al. |
| 5,030,603 | A | 7/1991 | Rumpf et al. |
| 5,120,455 | A | 6/1992 | Lunghofer |
| 5,175,133 | A | 12/1992 | Smith et al. |
| 5,188,175 | A | 2/1993 | Sweet |
| 5,266,243 | A | 11/1993 | Kneller et al. |
| 5,422,183 | A | 6/1995 | Sinclair et al. |
| 5,443,633 | A | 8/1995 | Hirsbrunner et al. |
| 5,597,784 | A | 1/1997 | Sinclair et al. |
| 5,649,596 | A | 7/1997 | Jones et al. |
| 5,654,246 | A | 8/1997 | Newkirk et al. |
| 5,656,568 | A | 8/1997 | Shiuh et al. |
| 5,964,291 | A | 10/1999 | Bourne et al. |
| 5,972,835 | A | 10/1999 | Gupta |
| 5,993,988 | A | 11/1999 | Ohara et al. |
| 6,059,034 | A | 5/2000 | Rickards et al. |
| 6,074,754 | A | 6/2000 | Jacobsen et al. |
| 6,080,232 | A | 6/2000 | Sperlich et al. |
| 6,123,965 | A | 9/2000 | Jacob et al. |
| 6,217,646 | B1 | 4/2001 | Gervais |
| 6,319,870 | B1 | 11/2001 | Beall et al. |
| 6,330,916 | B1 | 12/2001 | Rickards et al. |
| 6,364,018 | B1 | 4/2002 | Brannon et al. |
| 6,372,678 | B1 | 4/2002 | Youngman et al. |
| 6,503,676 | B2 | 1/2003 | Yamashita et al. |
| 6,528,157 | B1 | 3/2003 | Hussain et al. |
| 6,582,819 | B2 | 6/2003 | McDaniel et al. |
| 6,632,527 | B1 | 10/2003 | McDaniel et al. |
| 6,725,930 | B2 | 4/2004 | Boney et al. |
| 6,743,269 | B2 | 6/2004 | Meyer et al. |
| 6,749,025 | B1 | 6/2004 | Brannon et al. |
| 6,753,299 | B2 | 6/2004 | Lunghofer et al. |
| 6,766,817 | B2 | 7/2004 | Dias da Silva |
| 6,772,838 | B2 | 8/2004 | Dawson et al. |
| 6,780,804 | B2 | 8/2004 | Webber et al. |
| 6,918,404 | B2 | 7/2005 | Dias da Silva |
| 7,021,379 | B2 | 4/2006 | Nguyen |
| 7,036,591 | B2 | 5/2006 | Cannan et al. |
| 7,041,250 | B2 | 5/2006 | Sherman et al. |
| 7,066,586 | B2 | 6/2006 | Dias da Silva |
| 7,135,231 | B1 | 11/2006 | Sinclair et al. |
| 7,244,398 | B2 | 7/2007 | Kotary et al. |
| 7,270,879 | B2 | 9/2007 | McCrary |
| 7,285,255 | B2 | 10/2007 | Kadlec et al. |
| 7,387,752 | B2 | 6/2008 | Canova et al. |
| 7,426,961 | B2 | 9/2008 | Stephenson et al. |
| 7,459,209 | B2 | 12/2008 | Smith et al. |
| 7,491,444 | B2 | 2/2009 | Smith et al. |
| 7,569,199 | B1 | 8/2009 | Barron et al. |
| 7,678,723 | B2 | 3/2010 | Duenckel et al. |
| 7,721,804 | B2 | 5/2010 | Duenckel |
| 2003/0039573 | A1 | 2/2003 | Sherman et al. |
| 2004/0023818 | A1 | 2/2004 | Nguyen et al. |
| 2004/0040708 | A1 | 3/2004 | Stephenson et al. |
| 2004/0200617 | A1 | 10/2004 | Stephenson et al. |
| 2005/0028976 | A1 | 2/2005 | Nguyen |
| 2005/0028979 | A1 | 2/2005 | Brannon et al. |
| 2005/0077044 | A1 | 4/2005 | Qu et al. |
| 2005/0244641 | A1 | 11/2005 | Vincent |
| 2006/0078682 | A1 | 4/2006 | McDaniel et al. |
| 2006/0081371 | A1 | 4/2006 | Duenckel et al. |
| 2006/0135809 | A1 | 6/2006 | Kimmich et al. |
| 2006/0147369 | A1 | 7/2006 | Bi et al. |
| 2006/0162929 | A1 | 7/2006 | Urbanek |

| | | | |
|---|---|---|---|
| 2006/0175059 A1 | 8/2006 | Sinclair et al. |
| 2006/0219600 A1 | 10/2006 | Palamara et al. |
| 2007/0023187 A1 | 2/2007 | Canova et al. |
| 2007/0212281 A1 | 9/2007 | Kadlec et al. |
| 2008/0015531 A1 | 1/2008 | Hird et al. |
| 2008/0058228 A1 | 3/2008 | Wilson |
| 2008/0135245 A1 | 6/2008 | Smith et al. |
| 2008/0135246 A1 | 6/2008 | Canova et al. |
| 2008/0220996 A1 | 9/2008 | Duenckel et al. |
| 2008/0241540 A1 | 10/2008 | Canova et al. |
| 2009/0008093 A1 | 1/2009 | Duenckel |
| 2009/0032253 A1 | 2/2009 | Smith et al. |
| 2009/0032254 A1 | 2/2009 | Smith et al. |
| 2009/0038797 A1 | 2/2009 | Skala et al. |
| 2009/0038798 A1 | 2/2009 | Smith et al. |
| 2009/0065208 A1 | 3/2009 | Smith et al. |
| 2009/0118145 A1 | 5/2009 | Wilson et al. |
| 2009/0137433 A1 | 5/2009 | Smith et al. |
| 2009/0205825 A1 | 8/2009 | Smith, Jr. et al. |
| 2009/0288820 A1 | 11/2009 | Barron et al. |
| 2010/0059224 A1 | 3/2010 | Palamara et al. |
| 2010/0126728 A1 | 5/2010 | Duenckel et al. |

FOREIGN PATENT DOCUMENTS

| | | |
|---|---|---|
| AR | 243222 | 7/1993 |
| AU | 551409 | 1/1983 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |
| CA | 2444826 | 4/2004 |
| CH | 647689 | 2/1985 |
| CN | 1189475 | 8/1998 |
| DE | 2948584 | 6/1980 |
| DK | 168099 | 7/1983 |
| EA | 006953 | 6/2006 |
| EA | 007864 | 2/2007 |
| EA | 008825 | 8/2007 |
| EA | 010944 | 12/2008 |
| EA | 011732 | 4/2009 |
| EA | 012824 | 12/2009 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| EP | 402686 | 12/1990 |
| FR | 2486930 | 1/1982 |
| GB | 578424 | 7/1946 |
| GB | 715354 | 9/1954 |
| GB | 715882 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| MX | 161299 | 9/1990 |
| PH | 18450 | 7/1985 |
| RU | 2014281 | 6/1994 |
| RU | 2079471 | 5/1997 |
| RU | 2083528 | 7/1997 |
| RU | 2090537 | 9/1997 |
| RU | 2098387 | 12/1997 |
| RU | 2098618 | 12/1997 |
| RU | 2107674 | 3/1998 |
| RU | 2112189 | 5/1998 |
| RU | 2112761 | 6/1998 |
| RU | 2121988 | 11/1998 |
| RU | 2129985 | 5/1999 |
| RU | 2129987 | 5/1999 |
| RU | 2133716 | 7/1999 |
| RU | 2140874 | 11/1999 |
| RU | 2140875 | 11/1999 |
| RU | 2147564 | 4/2000 |
| RU | 2147565 | 4/2000 |
| RU | 2147717 | 4/2000 |
| RU | 2150442 | 6/2000 |
| RU | 2151124 | 6/2000 |
| RU | 2151125 | 6/2000 |
| RU | 2151987 | 6/2000 |
| RU | 2154042 | 8/2000 |
| RU | 2155735 | 9/2000 |
| RU | 99107936 | 1/2001 |
| RU | 2163227 | 2/2001 |
| RU | 2166079 | 4/2001 |
| RU | 2168484 | 6/2001 |
| RU | 2178924 | 1/2002 |
| RU | 2180397 | 3/2002 |
| RU | 2183370 | 6/2002 |
| RU | 2183739 | 6/2002 |
| RU | 2191167 | 10/2002 |
| RU | 2191169 | 10/2002 |
| RU | 2191436 | 10/2002 |
| RU | 2192053 | 10/2002 |
| RU | 2196675 | 1/2003 |
| RU | 2196889 | 1/2003 |
| RU | 2198860 | 2/2003 |
| RU | 2203248 | 4/2003 |
| RU | 2206930 | 6/2003 |
| RU | 2211198 | 8/2003 |
| RU | 2212719 | 9/2003 |
| RU | 2215712 | 11/2003 |
| RU | 2003100030/03 | 11/2003 |
| RU | 2002117351 | 1/2004 |
| RU | 2229456 | 5/2004 |
| RU | 2229458 | 5/2004 |
| VE | 49128 | 2/1993 |
| WO | WO 2005/100007 | 10/2005 |
| WO | WO 2006/010036 | 1/2006 |
| WO | WO 2006/032008 | 3/2006 |
| WO | WO 2006/094074 | 9/2006 |
| WO | WO 2007/016268 | 2/2007 |
| WO | WO 2008/008828 | 1/2008 |
| WO | WO 2008/028074 | 3/2008 |
| WO | WO 2009/009370 | 1/2009 |

OTHER PUBLICATIONS

Written Opinion, mailed Dec. 27, 2007, by the U.S. International Searching Authority, in connection with International Application No. PCT/US2007/073247.

Determining Feasibility of Fabricating Light Weight Proppants for Application in Gas and Oil Well Stimulation, Progress Report 10, DOE Contract DE-AC19-79BC10038, Submitted by Terra Tek, Inc., TR 80-77, Jul. 1980.

Light Weight Proppants for Deep Gas Well Stimulation, 2$^{nd}$ Annual Report, Jul. 1, 1980-Jun. 30, 1981, published Apr. 1982, DOE Contract AC19-79BC10038, by R.A. Cutler et al, Terra Tek, Inc.

Oxide Ceramic Proppants for Treatment of Deep Well Fractures, SPE 6816, by E.A. Neel, J.L. Parmley, and P.J. Colpoys, Jr. (1977).

Chemical Abstracts, vol. 85, No. 24, Dec. 13, 1976.

Hydraulic Fracturing with a High-Strength Proppant, Claude E. Cooke, Society of Petroleum Engineers of AIME, SPE 6213, 1976.

The Effect of Various Proppants and Proppant Mixtures on Fracture Permeability, Robert R. McDaniel, et al., SPE 7573, 1978.

DOE Progress Review No. 21 for reporting period Oct. 1-Dec. 31, 1979, Determining Feasibility of Fabricating Light Weight Proppants for Application in Gas and Oil Well Stimulation.

DOE Progress Review No. 22 for reporting period Jan. 1-Mar. 31, 1980, Determining Feasibility of Fabricating Light Weight Proppants for Application in Gas and Oil Well Stimulation.
DOE Progress Review No. 23 for reporting period Apr. 1-Jun. 30, 1980, Determining Feasibility of Fabricating Light Weight Proppants for Application in Gas and Oil Well Stimulation.
DOE Progress Review No. 24 for reporting period Jul. 1-Sep. 31, 1980, Determining Feasibility of Fabricating Light Weight Proppants for Application in Gas and Oil Well Stimulation.
DOE Progress Review No. 26 for reporting period Jan. 1-Mar. 31, 1981, Determine Feasibility of Fabricated Light Weight Proppants for Application in Gas and Oil Well Stimulation.
DOE Progress Review No. 27 for reporting period Apr. 1-Jun. 30, 1981, Determining Feasibility of Fabricating Light Weight Proppants for Application in Gas and Oil Well Stimulation.
Determining Feasibility of Fabricating Light Weight Proppants for Application in Gas and Oil Well Stimulation, Progress Report 2, DOE Contract DE-AC19-79BC10038, Submitted by Terra Tek, Inc., TR 79-77, Oct. 1979.
Light Weight Proppants for Deep Gas Well Stimulation, A. H. Jones et al, Terra Tek, Inc., Jun. 1980, TR Report 80-47.
New Proppants for Deep Gas Well Stimulation, SPE 9869, by Raymond A. Cutler, et al., 1977.
Effect of Grinding and Firing Treatment on the Crystalline and Glass Content and the Physical Properties of Whiteware Bodies; S. C. Sane, et al., 1951.
Nepheline Syenite-Talc Mixtures as a Flux in Low-Temperature Vitrified Bodies; E. D. Lynch, et al., Apr. 1950.
Engineering Properties of Ceramics, Databook to Guide Materials Selection for Structural Applications, J. F. Lynch, et al., TR 66-52, Jun. 1966.
Reactions in Silica-Alumina Mixtures, Richard R. West, et al., Apr. 1958.
Synthesis and Mechanical Properties of Stoichiometric Aluminum Silicate (Mullite), K. S. Mazdiyasni, et al., Dec. 1972.
Coors Porcelain Company letter to Halliburton Services, Inc. dated Aug. 4, 1978 with Proposal to Supply Proppant.
Coors Porcelain Company letter to B. J. Hughes, Inc. dated Aug. 24, 1978 with Proposal to Supply Proppant.
Unimin Brochure, Unimin Canada Ltd., Mar. 1991.
Role of Impurities on Formation of Mullite from Kaolinite and $Al_2O_3$-$S_1O_2$ Mixtures, Johnson, Sylvia M. et al., Ceramic Bulletin, vol. 61, No. 8 (1982), pp. 838-842.
Bauxite and Alumina, Luke H. Baumgardner, et al., Minerals Yearbook, 1987, vol. I.
The Industrial Uses of Bauxite, N. V. S. Knibbs, D.Sc., 1928.
Bauxite, Cyril S. Fox, 1927.
Document entitled "Feb., Mar., Apr. 1998: Commercial Activity", with Exhibits A-D.
Document entitled "Jul. 1998: Commercial Activity", with Exhibit E.
Document entitled "Sep. 2001: Commercial Activity", with Exhibit F.
ScalePROP brochure, Schlumberger, Jan. 2002.
Rickards, A. R., et al.; "High Strength, Ultra Lightweight Proppant Development Lends New Dimensions to Hydraulic Fracturing Applications", SPE 84308, Oct. 7, 2003.
Didion International, Inc.; Mold & Core Consumables; http://www.moderncasting.com/MoreInfo/0602/FMI_Article_08.asp; Dec. 27, 2002.
Itochu Ceratech Corp.; Ceramics and Minerals Department; http://www.itc-cera.co.jp/english/cera.htm; Jun. 8, 2002.
Enprotech Corp; About Enprotech; http:www.enprotech.com/aboutus.html; Copyright 2004.
Spraying Systems Co.; Air Atomizing Nozzles 1/2J Pressure Spray Set-ups Internal Mix; Air Atomizing Nozzles 1/2J Series External Mix Set-ups; Air Atomizing Nozzles 1/2J Siphon/Gravity-Fed Spray Set-ups; pp. 358-362; Copyright 2003.
Spraying Systems Co.; Air Atomizing Nozzles 1/8J and 1/4J Set-ups External Mix; pp. 282-285; Copyright 2003.
Spraying Systems Co.; Air Atomizing Nozzles Basic Information; pp. 268-269; Copyright 2003.
Spraying Systems Co.; Engineer's Guide to Spray Technology; Copyright 2000.

Environmental Conservation-Oriented Businesses; Itochu Corporation; pp. 11-16; Jul. 2004.
Itochu Ceratech Corporation; CERABEADS—Spherical Ceramic Sand; http://exhibits.gifa.de/exh/GMTN2003/e/3231240; Mar. 13, 2005.
Naigai Ceramics Co., Ltd.; Naigai Cerabeads 60; Aug. 1986.
"rock." Encyclopedia Britannica 2007. Encyclopedia Britannica Article. Jun. 27, 2007.
Perry's Chemical Engineers' Handbook Section 12, 7th Edition, 1997, pp. 12-81 to 12-90.
International Search Report issued by the ISA/US on Mar. 14, 2006 in connection with International Application No. PCT/US2005/012256.
Written Opinion of the International Searching Authority issued by the ISA/US on Mar. 14, 2006 in connection with International Application No. PCT/US2005/012256.
International Search Report mailed Aug. 29, 2006, by the ISA/US regarding International Application No. PCT/US2005/024339.
Written Opinion mailed Aug. 29, 2006, by the ISA/US regarding International Application No. PCT/US2005/024339.
International Preliminary Report on Patentability mailed Jan. 18, 2007, by the IB regarding International Application No. PCT/US2005/024339.
International Search Report mailed Oct. 4, 2006, by the ISA/US regarding International Application No. PCT/US2005/033092.
Written Opinion mailed Oct. 4, 2006, by the ISA/US regarding International Application No. PCT/US2005/033092.
International Preliminary Report on Patentability mailed Apr. 20, 2007, regarding International Application No. PCT/US2005/033092.
International Search Report mailed Jul. 13, 2007, by the ISA/US regarding International Application No. PCT/US2006/007308.
Written Opinion mailed Jul. 13, 2007, by the ISA/US regarding International Application No. PCT/US2006/007308.
International Preliminary Report on Patentability mailed Sep. 20, 2007, by the IB regarding International Application No. PCT/US2006/007308.
International Search Report mailed Jun. 8, 2007, by the ISA/US regarding International Application No. PCT/US2006/029234.
Written Opinion mailed Jun. 8, 2007, by the ISA/US regarding International Application No. PCT/US2006/029234.
International Preliminary Report on Patentability mailed Feb. 7, 2008, by the IB regarding International Application No. PCT/US2006/029234.
International Search Report mailed Dec. 27, 2007, by the ISA/US regarding International Application No. PCT/US2007/073247.
Written Opinion mailed Dec. 27, 2007, by the ISA/US regarding International Application No. PCT/US2007/073247.
International Preliminary Report on Patentability mailed Jan. 13, 2009, by the IB regarding International Application No. PCT/US2007/073247.
International Search Report mailed Feb. 22, 2008, by the ISA/US regarding International Application No. PCT/US2007/077290.
Written Opinion mailed Feb. 22, 2008, by the ISA/US regarding International Application No. PCT/US2007/077290.
International Preliminary Examination Report mailed Feb. 20, 2009, by the IB regarding International Application No. PCT/US2007/077290.
Written Opinion mailed Oct. 6, 2008, by the ISA/US regarding International Application No. PCT/US2008/069012.
International Search Report mailed Oct. 6, 2008, by the ISA/US regarding International Application No. PCT/US2008/069012.
Correspondence from foreign counsel dated Nov. 29, 2007, regarding Office Action issued in connection with Eurasian Patent Application No. 200700296.
Correspondence from foreign counsel dated Feb. 29, 2008, regarding Office Action issued in connection with Eurasian Patent Application No. 200700583.
Correspondence from foreign counsel dated May 9, 2008, regarding Office Action issued in connection with Eurasian Patent Application No. 200700583.
Correspondence from foreign counsel dated Sep. 15, 2008, regarding Office Action issued in connection with Eurasian Patent Application No. 200700583.

Correspondence from foreign counsel dated Jul. 10, 2008, regarding Office Action issued in connection with Eurasian Patent Application No. 200701830.

Correspondence from foreign counsel dated Aug. 25, 2008, regarding Office Action issued in connection with Eurasian Patent Application No. 200800008.

Office Action issued Jun. 12, 2008, by the State Intellectual Property Office, P.R. China, regarding GCC Patent Application No. GCC/P/2005/4586.

Office Action issued Jun. 19, 2009, by the State Intellectual Property Office, P.R. China, regarding Chinese Patent Application No. 200580030660.3.

Office Action issued Aug. 21, 2009, by the State Intellectual Property Office, P.R. China, regarding Chinese Patent Application No. 200680038963.4.

* cited by examiner

MATERIAL HAVING A CONTROLLED MICROSTRUCTURE, CORE-SHELL MACROSTRUCTURE, AND METHOD FOR ITS FABRICATION

CROSS-REFERENCE TO RELATED APPLICATIONS

This application claims priority of U.S. Provisional Patent Application Ser. No. 60/807,012, filed Jul. 11, 2006, entitled "Dopant Enhanced Densification of Aluminosilicate Aggregate" which is incorporated herein by reference.

FIELD OF THE INVENTION

The inventions disclosed herein relate to materials and to methods for their fabrication. Certain embodiments of the invention relate to a microstructured material having a core/shell structure. Certain other embodiments relate to a material having a ceramic-based core structure with tailored porosity surrounded by a dense metal or metal-oxide based shell.

BACKGROUND OF THE INVENTION

Ceramic type mineral materials generally combine high strength with chemical and thermal stability. Hence they have significant utility in many products and processes. For example, ceramic-based materials are often used as supports for catalysts and as casting sands and mold materials used for the fabrication of a variety of articles in high temperature fabrication processes. Particulate ceramic materials also have significant utility as proppants in hydrocarbon recovery processes. Such materials are injected, under very high pressures, into geological structures, together with carrier fluids in a process called hydrofracturing. The injected fluid opens cracks in rock structures allowing for the passage of hydrocarbon products therethrough. The proppant materials wedge into these opened cracks and serve to maintain the integrity and permeability of the cracked structure during the extraction process. Such materials need to have high strength and chemical inertness, and should also have densities comparable to that of the carrier fluid. In addition, since these materials are used in very large amounts, their cost should be low.

SUMMARY OF THE INVENTION

The present invention relates to ceramic-based, tailored microstructure materials comprising a ceramic core having a plurality of voids therein, and further including a metal or metal-oxide shell on the outer surface thereof. According to embodiments of the present invention, the ceramic-based, tailored microstructure materials are prepared by a dopant induced transient liquid phase sintering process under controlled oxygen fugacity. The methods of such embodiments may be utilized to prepare a variety of materials having selectably controllable properties such as density, chemical reactivity, thermal reactivity, strength and the like.

According to certain embodiments of the method of the present invention for making a material having a controlled microstructure, the method includes providing particles of a ceramic mineral material the particles having a metal oxide dopant therein. The particles of the ceramic mineral material are consolidated into larger aggregates of a desired size. The aggregates of the ceramic mineral particulates are heated initially under reducing conditions so that at least part of the metal oxide dopant is reduced to form a metastable, transient liquid phase among the particles. The liquid phase includes at least part of the reduced metal oxide dopant, promotes sintering among the particles and forms islands of reduced metal oxide dopant within and on the surface of the aggregates. Following heating under reducing conditions, the aggregates are heated under oxidizing conditions such that the islands of reduced metal oxide are oxidized and/or go into solid solution within the particles, thereby creating voids within and forming a shell on the aggregates.

According to certain embodiments of the present invention, the ceramic mineral material can include oxides of aluminum, oxides of silicon, aluminosilicates and combinations thereof. In some embodiments, the ceramic mineral material can include kaolinite, bauxite, fly ash and combinations thereof. In some embodiments, the metal oxide dopant can include an oxide of a polyvalent transition metal and in some embodiments can include oxides of iron, and/or oxides of titanium, chromium, manganese, or others, and combinations thereof. In one embodiment, the dopant includes hematite. In some embodiments, the amount of metal oxide dopant can range from approximately 0.1 to 30 weight percent of the particles. In some embodiments, the aggregates can have a sieve size in the range of 12-20 to 20-40 mesh and at least one of the heating steps includes a temperature in the range of 1100-1800° C. In some embodiments, larger or smaller aggregate size ranges are used. When heated within this temperature range under a controlled oxygen fugacity, the liquid phase forms a metastable eutectic with the ceramic mineral material, thereby promoting sintering. Post sintering thermal treatment under an alternative oxygen fugacity causes the formation of voids within the aggregates.

In an exemplary embodiment of the present invention, the reducing conditions include a reducing atmosphere with a partial pressure of oxygen of less than 0.005 atm. The oxidizing conditions include an oxidizing atmosphere made from air and can be carried out at atmospheric pressure. Alternative oxidizing conditions can be selected to promote the evolution of the metastable transient liquid phase, as well as to alter the subsequent phase stability of the dopant oxides to promote pore evolution. The aggregates can be stirred during at least one of the heating steps so as to prevent sticking and agglomeration thereof.

DETAILED DESCRIPTION

Figure 1:
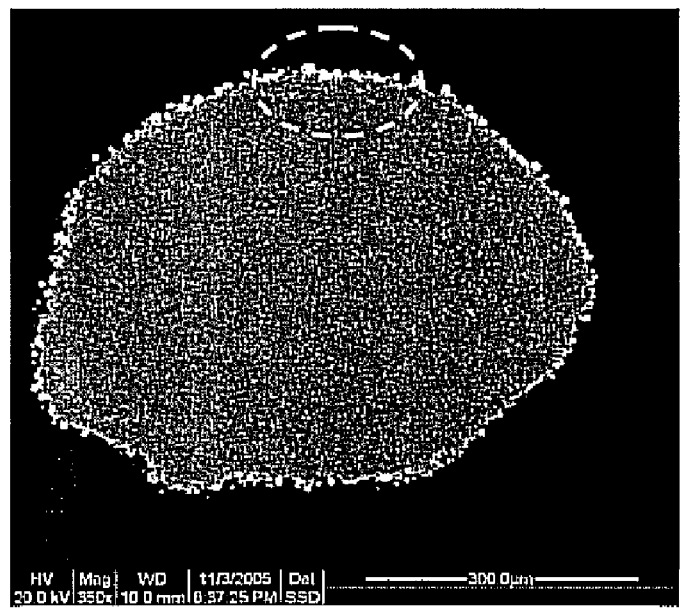
FIG. 1 is a scanning electron image of the cross-section of an aggregate of the present invention after being heated under reducing conditions.

In general, the methods of the present invention may be implemented utilizing a variety of mineral materials. Typically, the materials used in the various embodiments of the present invention comprise ceramics, and in specific instances, they may comprise oxide and/or silicate-based ceramics such as alumina, aluminosilicates, silicates, and the like. These minerals may include natural products such as kaolin or bentonites, or they may comprise specifically synthesized ceramic materials, or they may comprise industrial byproducts such as fly ash. A dopant material comprising a metal oxide is incorporated into the ceramic material in an amount sufficient so as to facilitate the reactions described hereinbelow. In specific instances, the ceramic material may naturally include some amount of the dopant species therein, and an additional amount of metal oxide dopant can be added so as to raise the total concentration of the dopant material in the ceramic material to between approximately 0.1-30 percent by weight of the ceramic material. In some instances, the as-obtained mineral material will include relatively large amounts of the dopant species therein, while in other instances, the concentration will be low to negligible. Appropriate supplementation may be made by one of skill in the art.

Following the incorporation of the dopant, the mineral material is prepared for further processing, typically by forming it into aggregates having a size and shape consistent with the intended end use of the resultant product. Typically, the starting materials are ground or otherwise pulverized, together with the dopant material. In some instances, the resultant particles are pelletized into substantially larger aggregates so as to provide the resultant product with a desired texture, geometry and size. The specific size of particles employed will depend upon particular applications; however, for many typical applications, including applications as hydrocarbon recovery proppants, particle sizes in the range of 12-20 mesh to 20-40 mesh will be employed. As is known to those of ordinary skill in the art, particles having a size range of 12-20 mesh will pass through a sieve having a 12 mesh size, but be retained by a sieve having a 20 mesh size. A similar relationship holds true for particles having a 20-40 mesh size, It should be understood that in other applications, larger or smaller particle sizes may be employed.

Following the formation of the aggregates, the dopant-containing particles are heated under reducing conditions. Heating may, for example, be carried out in a kiln or furnace, and in specific instances, a rotary kiln is employed to assure that particle-particle adhesion during heating is minimized. The reducing conditions are typically supplied by introducing a reducing atmosphere into the vessel in which the heating is taking place. This atmosphere may comprise a forming gas ($N_2/H_2$ mixture) as is known in the art, or it may comprise other reducing atmospheres such as a hydrogen atmosphere, a hydrocarbon-containing atmosphere or the like. In this heating step, the reducing atmosphere at least partially reduces the metal oxide dopant and assists in the formation of a metastable transient liquid phase. This reduction of the metal oxide dopant produces a reduced species comprising lower oxides, a free metal, or a combination of the foregoing. Heating is carried out at a temperature sufficient to liquefy the at least partially reduced dopant material, and this liquid phase serves to facilitate sintering of the mineral material. In some embodiments, the liquid phase forms a metastable eutectic with the mineral material and thereby causes sintering to occur at a lower temperature than would be the case if the liquid phase was not present. This liquid phase migrates through the mineral material, and in general, is further reduced in the course of the heating under reducing conditions. In many instances, the further reduction increases the amount of free metal in the liquid phase, and since the free metal is less likely to wet the mineral material, it thereby aggregates to produce metallic islands both in the bulk of the material also known as the matrix material and on the surface of the particles. The net result of the heating under reducing conditions is the production of a sintered particulate material having islands of a metal and/or a metal-containing species disposed both in the matrix material and on the surface thereof. The matrix material includes polycrystalline ceramic material with glassy grain boundaries, the glassy grain boundaries having an amorphous and/or non-amorphous structure.

The sintered particulate material prepared by heating under reducing conditions is then subjected to heating under oxidizing conditions. In particular embodiments, the heating tinder oxidizing conditions is implemented by heating the sintered particulate material in ambient air, at atmospheric pressure; although, in other instances, more or less vigorous oxidation conditions may be found to be beneficial. When the sintered particulate material is heated under oxidizing conditions, the islands of metal in the matrix material interact with the matrix material and the oxidizing atmosphere and are at least partially reabsorbed back into the matrix material either as oxidized metal or as a component of a complex with the matrix material. The oxidizing conditions can be judiciously selected to tailor the resulting stability of selected crystalline and/or amorphous constituents to promote pore evolution via oxidative decomposition. The net result is that a plurality of voids are formed in the matrix material. The metallic material disposed on the outer surface of the sintered particulate material is not reabsorbed into the matrix material, or is at least reabsorbed to a lesser degree and typically consolidates and disperses so as to form a relatively voidless shell-like structure surrounding the inner structure of the particle having a plurality of voids therein. It is to be understood that this shell may comprise a continuous or a discontinuous body. In some instances, the metallic material on the surface of the particle interacts to some degree with the oxidizing atmosphere so as to form an at least partially oxidized metallic material.

The net result of the process is the production of an aggregate comprised of sintered primary particles, resulting in a relatively high strength ceramic body having a plurality of voids therein and further including a relatively voidless outer shell of a metal or metal-oxide based material. These aggregates have high strength and relatively low density owing to the void structure therein. It will be appreciated by those of ordinary skill in the art that by the appropriate selection of materials and reaction conditions, properties of the aggregate comprised of sintered primary particles may be readily controlled over a wide range of compositional and processing parameters (e.g. temperature, time, oxygen fugacity, etc.).

In one specific group of embodiments of the process of the present invention, starting mineral ores of kaolinite and bauxite were ground to a fine powder (approximately 30 micron) and doped with up to ten weight percent of hematite ($Fe_2O_3$) each. The powders were spheroidized in an industrial mixer and size classified by sieving to isolate aggregates in the size range of 12-20 to 20-40 mesh. The resultant mixtures were then heated in a rotary kiln at a temperature in the nominal range of 1400-1600° C. under a forming gas atmosphere ($N_2/H_2$ mixture). The oxygen partial pressure was below 0.05 atm, and it was noted that during the sintering process the $Fe_2O_3$ was initially reduced to FeO, which forms a metastable eutectic mixture with alumina, silica, and aluminosilicates at a temperature of approximately 1148° C. The formation of this eutectic mixture promoted the sintering of the mineral material at a relatively low temperature. Capillary forces aided in the passage of the iron-rich aluminosilicate liquid through the particulate material, thereby redistributing solids and minimizing porosity through solution precipitation reactions between the liquid and the solid.

Figure 2:
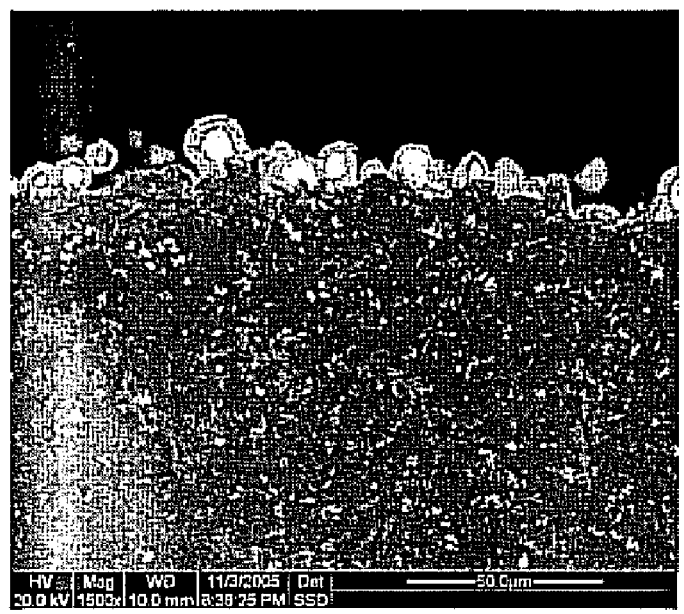
FIG. 2 is a scanning electron image of the circle region shown in FIG. 1.

As the reduction process proceeded, the iron-rich aluminosilicate liquid was further reduced to form elemental iron. Elemental iron does not readily wet ceramic materials, and hence the liquid phase in the interior portions of the aggregate formed pockets or islands while the liquid phase at the exterior segregated to the surface to form islands thereupon. This process resulted in formation of a ceramic sphere having islands of metal dispersed on the outer surface thereof, and further containing metal islands therein. This material could be used as is for a catalyst, and appropriate catalytic activity could be selected by an appropriate choice of metal oxide dopants. FIG. 1 shows a scanning electron micrograph of a cross section of a bauxite-derived aggregate doped with 10% hematite after being heated in the nominal range of 1400-1600° C. under the forming gas. FIG. 2 is a higher magnification of the circled region in FIG. 1. As shown in these two figures, the aggregate is relatively dense and includes significant amounts of iron on the surface thereof.

Figure 3:
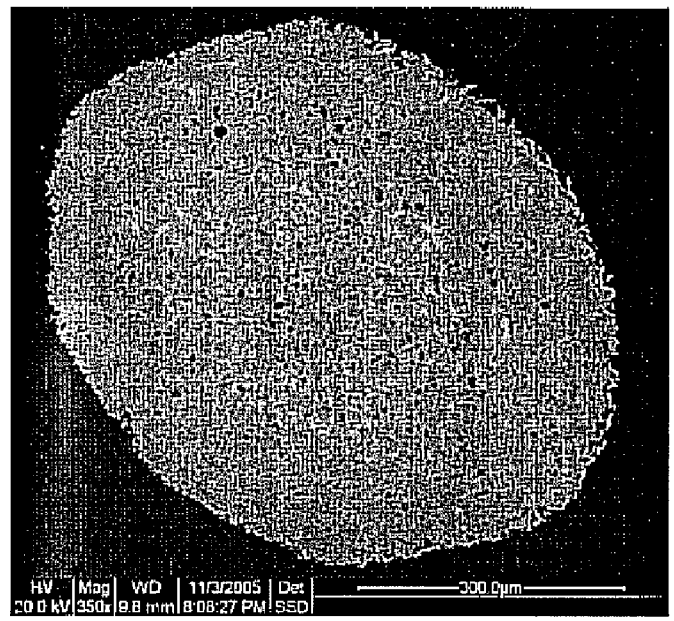
FIG. 3 is a scanning electron image of the cross-section of an aggregate of the present invention after being heated under oxidizing conditions.
Figure 4:
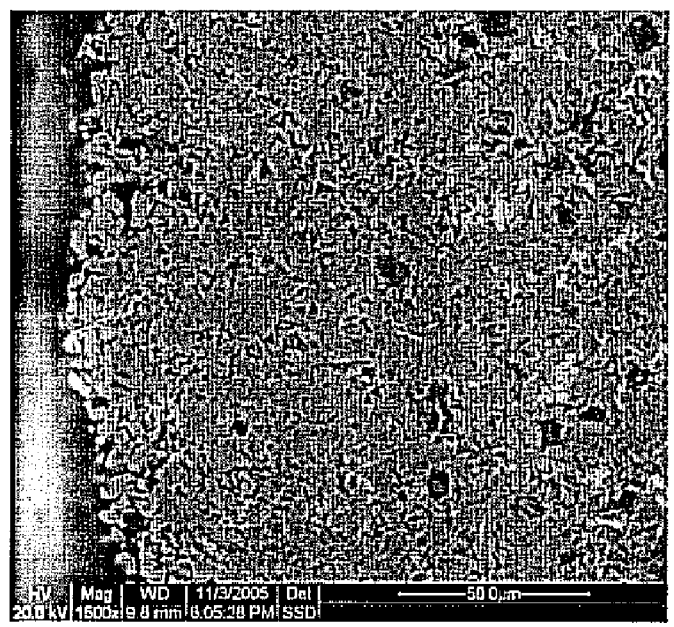
FIG. 4 is a higher magnification of the aggregate shown in FIG. 3.

Next, the thus-produced particles were heated in an oxidizing atmosphere, which in this embodiment was comprised of air at atmospheric pressure. Heating was again carried out in a rotary kiln at temperatures in the nominal range of 1400-1600° C. This heating process caused the internal islands of elemental iron to be taken back up by the solid matrix material. The iron dissolved into the matrix and/or reacted with surrounding crystal phases, as for example to produce iron titanates. The take-up of the metal produced a number of voids in the sintered aggregate via oxidative decomposition of less stable metal oxides and further served to densify and consolidate the outer metal shell/layer, as shown in FIGS. 3 and 4.

The materials thus produced exhibited a structure which combined high strength together with a controlled density. An example of the experimental parameters used in the above-described process are listed below in Table 1. In addition, Table 2 provides properties of particles produced according to the present invention wherein the characteristic strength, specific gravity and specific strength are compared with current state of the art materials CARBOHSP® and CARBOPROP® with a 20-40 mesh size, manufactured by CARBO Ceramics of Irving, Tex. As shown by Table 2, particles of this type have improved properties in terms of a reduction of specific gravity while maintaining strength and an increase in specific strength (i.e. the ratio of strength to density). compared to current state of the art materials and have significant utility as proppant materials.

It will be appreciated that by appropriate control of reaction conditions, dopant materials, dopant quantities and the like, the ultimate microstructure of the aggregate may be selectably determined.

While the foregoing has described the preparation of microstructured particles utilizing an iron-based dopant, it is to be understood that other dopant species may be similarly employed. For example, other polyvalent transition metals such as titanium, tin, chromium, manganese and the like may be employed singly or in combination so as to produce composites which include those specified metals. Such materials may have particular utility as catalysts, electro- and/or magnetically-active materials or the like. It is also to be understood that the thus-prepared particles may be subjected to further reactions. For example, the metal-containing particles may be subjected to other reactive atmospheres such as carburizing atmospheres, nitriding atmospheres and the like so as to produce particles having coatings of metal carbides, nitrides and the like on their surfaces. Such particles and/or aggregates can exhibit enhanced hardness and may have utility as high-strength materials, abrasives and the like.

According to certain embodiments, the dopant materials used in the present invention will be present in a range of between 0.1-30 weight percent of the ceramic material. In some embodiments, the dopant materials will be present in a range of between 0.1-10 weight percent of the ceramic material, and in other embodiments in a range of between 5-10 weight percent of the ceramic material.

Typical reduction reactions will be carried out at a temperature range sufficiently high to promote the formation of the transient: metastable liquid phase, and this range will typically be 800-1800° C. In some embodiments, the temperature range will be 1100-1800° C., and in other embodiments the temperature range will be 1400-1600° C. Reaction times will depend upon the temperature and the nature of the materials employed, but it is anticipated that most commercially feasible processes will utilize reaction times for the reduction step in the range of 20-120 minutes. The oxidation reaction will typically be carried out under time and temperature conditions similar to those for the reduction step.

While the foregoing has described the use of rotary kilns for the heating step, it is to be understood that other heating systems may be employed. These can include fluidized bed reactors, stirred bed reactors, tube furnaces, microwave heating, and other such heating systems. The heating may be carried out in a single reactor by varying the atmosphere therein or by using different atmospheric zones. The process may also be carried out using separate reactors.

TABLE 1

| Step # | Rate (° C./min) | Temperature (° C.) | Dwell Time (min) | Oxygen Partial Pressure (atm) |
|---|---|---|---|---|
| Step 1 | 16 | 1450 | 30 | $1.00 \times 10^{-8}$ |
| Step 2 | 16 | 1450 | 30 | 0.21 (air) |

TABLE 2

| Ceramic Mineral Material | Iron Oxide Content (wt %) | Sintering Stage | Alumina Content (wt %) | Characteristic Strength (MPa) | Specific Gravity (g/cc) | Specific Strength (MPa/(g/cc)) |
|---|---|---|---|---|---|---|
| Bauxite | 5 | Reducing | 72 | | | |
| Bauxite | 5 | Oxidizing | 72 | 193 | 3.16 | 61 |
| Bauxite | 10 | Reducing | 72 | | | |
| Bauxite | 10 | Oxidizing | 72 | 166 | 3.43 | 48 |
| Kaoilnite | 5 | Reducing | 48 | 236 | 2.68 | 88 |
| Kaolinite | 5 | Oxidizing | 48 | 147 | 2.51 | 59 |
| Kaolinite | 10 | Reducing | 48 | 136 | 2.75 | 49 |
| Kaolinite | 10 | Oxidizing | 48 | 102 | 2.85 | 36 |
| CARBOHSP ® | | | 80 | 250 | 4.00 | 63 |
| CARBOPROP ® | | | 72 | 210 | 3.70 | 57 |

The invention claimed is:

1. A method for making a material having a controlled microstructure comprising:
   providing ceramic mineral material particles comprising a metal oxide dopant;
   consolidating a plurality of said particles into aggregates comprising a plurality of said particles;
   heating said aggregated particles in a reducing atmosphere under conditions of controlled oxygen fugacity so as to at least partially reduce said dopant to at least one of a lower metal oxide and free metal and form a metastable, transient liquid phase amongst said particles, said liquid phase comprising said at least one of a lower metal oxide and free metal; whereby said liquid phase promotes sintering of said aggregated particles and forms islands comprising said free metal in the interior of and on the surface of said aggregated particles; and
   heating in an oxidizing atmosphere said aggregated particles having said islands comprising said metal formed therein, so as to cause at least a portion of the material comprising said islands in the interior of said aggregated particles to be taken up by said aggregated particles, the talking up of the material comprising said islands forming an inner region of said aggregated particles with a plurality of voids and forming an outer shell region with fewer voids than said inner region.

2. The method of claim 1, wherein said ceramic mineral material comprises an oxygen-containing mineral material selected from the group consisting of oxides of aluminum, oxides of silicon, aluminosilicates and combinations thereof.

3. The method of claim 2 wherein said oxygen-containing mineral material is selected from the group consisting of kaolinite, bauxite, fly ash and combinations thereof.

4. The method of claim 1 wherein said metal oxide dopant includes an oxide of a polyvalent transition metal.

5. The method of claim 4 wherein said metal oxide dopant comprises $Fe_2O_3$.

6. The method of claim 1 wherein said ceramic mineral material particles comprise 0.1-10 percent by weight of said metal oxide dopant.

7. The method of claim 1 wherein said aggregated particles have a sieve size in the range of 12-20 to 20-40 mesh.

8. The method of claim 1 wherein said aggregated particles are heated in said reducing atmosphere to a temperature in the range of 800-1800° C.

9. The method of claim 1 wherein said liquid phase forms a metastable eutectic with the ceramic mineral material.

10. The method of claim 1 wherein said reducing atmosphere has a partial pressure of oxygen of less than 0.005 atm.

11. The method of claim 1 wherein said oxidizing atmosphere comprises air.

12. The method of claim 1 wherein said aggregated particles are heated in said oxidizing atmosphere at atmospheric pressure.

13. The method of claim 1 comprising spheroidizing said particles into aggregates prior to heating said aggregated particles in said reducing atmosphere.

14. The method of claim 1 wherein said aggregated particles are stirred during heating so as to prevent further agglomeration thereof.

15. The method of claim 1 wherein said metal oxide dopant comprises $Fe_2O_3$, and wherein when said aggregated particles are heated in said reducing atmosphere, said metal oxide dopant is initially reduced to FeO which forms a metastable eutectic mixture with the ceramic mineral material of said aggregated particles, and wherein said FeO is subsequently at least partially reduced to Fe and said islands include said Fe.

16. A method for making a material having a controlled microstructure comprising:
   providing particles comprising a ceramic mineral material and a metal oxide dopant wherein said ceramic mineral material is selected from the group consisting of kaolinite, bauxite, fly ash and combinations thereof and wherein said metal oxide dopant is selected from the group consisting of oxides of polyvalent transition metals;
   consolidating a plurality of said particles into aggregates comprising a plurality of said particles;
   heating said aggregated particles in a reducing atmosphere having a partial pressure of oxygen of less than 0.005 atm and so as to at least partially reduce said metal oxide dopant and form a metastable transient liquid phase in said particles, said liquid phase comprising said at least partially reduced metal oxide dopant; whereby said liquid phase promotes sintering of said aggregated particles and forms islands of reduced metal in the interior and on the surface of said aggregated particles; and
   heating said aggregated particles having said islands formed therein in air, so as to cause at least a portion of the reduced metal forming said islands in the interior of said aggregated particles to be taken up by said aggregated particles creating voids therein and to consolidate the islands of said metal on the surface of said aggregated particles so as to at least partially form a shell thereupon.

* * * * *

UNITED STATES PATENT AND TRADEMARK OFFICE
CERTIFICATE OF CORRECTION

PATENT NO.       : 7,828,998 B2
APPLICATION NO.  : 11/775671
DATED            : November 9, 2010
INVENTOR(S)      : Luscher et al.

It is certified that error appears in the above-identified patent and that said Letters Patent is hereby corrected as shown below:

On the Title page:

change

Item "(73) Assignee: Carbo Ceramics, Inc., Houston, TX (US)"

to

--(73) Assignees: Carbo Ceramics, Inc., Houston, TX (US); The Penn State Research Foundation, University Park, PA (US)--

Signed and Sealed this
Twenty-second Day of March, 2011

David J. Kappos
*Director of the United States Patent and Trademark Office*